United States Patent Office 3,243,260
Patented Mar. 29, 1966

3,243,260
METHOD FOR PREPARING CrO₂ OF RUTILE TYPE CRYSTALLINE STRUCTURE
Buichi Kubota, Hirakata-shi, Osaka, Tomozo Nishikawa, Kaizuka-shi, Osaka, Hiroyuki Chiba, Moriguchi-shi, Osaka, and Minoru Sugimura, Gose-shi, Nara-ken, Japan, assignors to Matsushita Electric Industrial Co., Ltd., Osaka, Japan, a corporation of Japan
Filed June 11, 1962, Ser. No. 201,708
Claims priority, application Japan, June 12, 1961, 36/21,023
4 Claims. (Cl. 23—145)

This invention relates to ferromagnetic chromium dioxide which has a rutile-type crystalline structure and its preparation.

It is well known that a type of chromium oxide has ferromagnetic properties and it is in the form of chromium dioxide. However, preparation of pure ferromagnetic chromium-dioxide by a reaction under atmospheric pressure has been very difficult.

The conventional process for producing magnetic chromium dioxide is to heat-decompose chromium trioxide under high oxygen pressure. In general, when metal oxides are heated to high temperature, the oxides become lower oxides losing oxygen. As the temperature is elevated, the following reaction proceeds towards the right:

$$MeO_x \rightarrow MeO_y \rightarrow MeO_z \quad (1)$$
$$x > y > z$$

where $x$, $y$, and $z$ are numbers, Me is a metal and O is oxygen.

The reaction velocity of the reaction (1) depends on partial pressure of oxygen in the atmosphere under which the metal oxides are placed, and the reaction more readily proceeds to lower the partial pressure. Changes of chromium oxides are not an exception. Therefore, a mixture of various chromium oxides, principally consisting of $Cr_2O_3$ which is a nonferromagnetic material is obtained in place of chromium dioxide which is a ferromagnetic body, when chromium trioxide is heated in air. This is because decomposition of oxygen in the trioxide readily occurs. That is to say, chromium trioxide decomposes hereinunder:

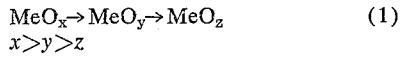

$$CrO_3 \rightarrow Cr_3O_8 \rightarrow Cr_2O_5 \rightarrow CrO_2 \rightarrow Cr_2O_3$$

When chromium trioxide is heated in air, the above decomposition cannot be terminated just at the stage of $CrO_2$, even if heating is carefully controlled at a proper temperature to produce only $CrO_2$.

Thus, the end product always accompanies $Cr_2O_5$ and $Cr_2O_3$ which are nonferromagnetic materials. In view of the fact mentioned above, chromium trioxide is heat-decomposed under high pressure of oxygen controlling the decomposition to produce pure $CrO_2$. The ferromagnetic chromium dioxide thus obtained is a rutile type crystalline material and has grain size of 5~10μ in length and 4~7μ in width, ferromagnetic Curie temperature of 116.5° C., and saturation magnetization of 131 e.m.u./g. at 0° (absolute) and of 102±2 e.m.u./g. at room temperature. Although the value of saturation magnetization of the product dioxide is uniquely high as a magnetic material in the form of an oxide, the coercive force is only as low as 20–70 Oe, which may vary depending on a method for preparing the same. Namely, chromium dioxide is neither a hard nor a soft magnetic material. Accordingly, the commercial uses of the conventional chromium dioxide are restricted because of its coercive force.

It is an object of the present invention to provide crystalline chromium dioxide of rutile-type maintaining high saturation magnetization characteristics of the conventional chromium dioxide and having improved properties such as smaller grain size and higher coercive force.

It is another object of the present invention to provide chromium dioxide which is useful for materials for magnetic recording devices.

It is a further object of the present invention to provide a method for preparing a new type of chromium dioxide.

In the accompanying drawings, FIGURE 1 is a temperature-oxygen pressure phase diagram showing changes in crystalline forms of the chromium oxides.

According to the present invention, a new type of chromium dioxide is provided by heating a mixture of chromium trioxide and a tellurium compound at a temperature between 380° and 480° C., particularly 380° and 420° C. in the presence of oxygen. As the amounts of the tellurium compound added is increased, the temperature may be lowered below 380° C. The tellurium compound may be metal or any compounds thereof. An intimate mixture of chromium trioxide and the tellurium compound is produced as mentioned hereinunder. First, the tellurium compound is dissolved in water, nitric acid, chloric acid or a mixture thereof, and its solution is added to an aqueous solution of chromium trioxide. The mixture is thoroughly mixed and heated at 50°–150° C. to dryness. It should be noted that tellurium ion in the solution is preferably in the hexavalent form. If the tellurium ion is of the tetravalent form, the $Te^{+4}$ ion will be oxidized to the $Te^{+6}$ ion during the mixing, while the $Cr^{+6}$ ion is reduced to the $Cr^{+3}$ ion. This means that chromium ion in the starting mixture solution is in trivalent form, with the result that the final heat-decomposition product, $CrO_2$ was contaminated by $Cr_2O_3$. The $Cr_2O_3$, which is a nonferromagnetic material, may be separated off by magnetic means from the $CrO_2$ which is a ferromagnetic material.

Figure 1:
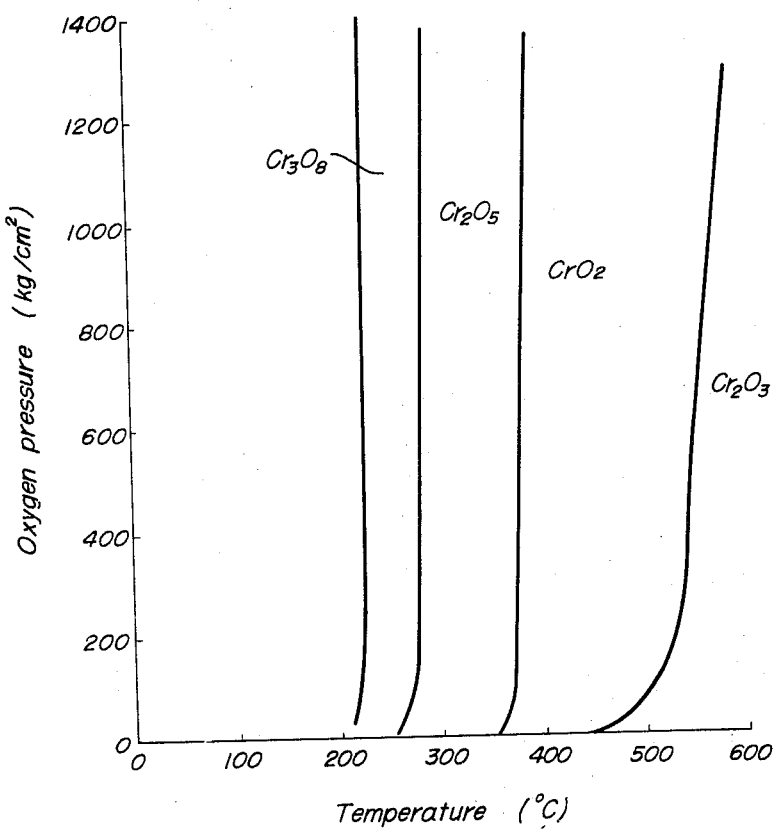

Secondly, the dry mixture of tellurium compound and chromium trioxide is charged in an autoclave and heated. In the well known way, chromium trioxide is enclosed in a closed vessel made of gold or platinum and the vessel is placed in the autoclave to which hydraulic or steam pressure is applied from the outside, and then heat is applied from the outside. In such a case, chromium trioxide is decomposed to generate oxygen which is accumulated in the closed vessel thereby with tendency to expand the vessel. The expanding force becomes gradually in equilibrium with the hydraulic or steam pressure applied from the outside. This means that the decomposition of chromium oxides was effected under the same pressure of oxygen as that of hydraulic or steam pressure applied from the outside. Such a process is not economical because capacity is very small. It is best to charge or pack chromium trioxide in an autoclave and then to heat from the outside rapidly till 200° C. and slowly above 200° C., from an economical point of view. As is seen in FIGURE 1 of the accompanying drawings, $Cr_3O_8$ phase appears at a temperature slightly higher than 200° C. and at the same time oxygen is generated in the autoclave. If heating is effected slowly above 200° C., the generated oxygen serves to control decomposition of the chromium oxides in the autoclave and the reaction proceeds favorably, without any application of oxygen, water or steam pressure from outside of the autoclave. In some cases, the presence of water in the reaction is inhibited, because corrosion of the autoclave occurs, although the corrosion is very slight. In addition, the presence of water reduces the saturation magnetization value of the final $CrO_2$ product, because nonmagnetic CrOOH is produced which might be so imperceptible that X-ray diffraction analysis fails to detect it. However, there are some cases where the presence of water is preferable. The Curie temperature of the product obtained in the presence of water is about 20° C. higher than that obtained in the absence of water. The fact that chromium oxides react with the autoclave wall due to the presence of water favors production of chromium dioxide having a high Curie temperature. The increase in Curie temperature would be due to formation of a solid solution of autoclave wall constituting metal with chromium dioxide.

Figure 2:
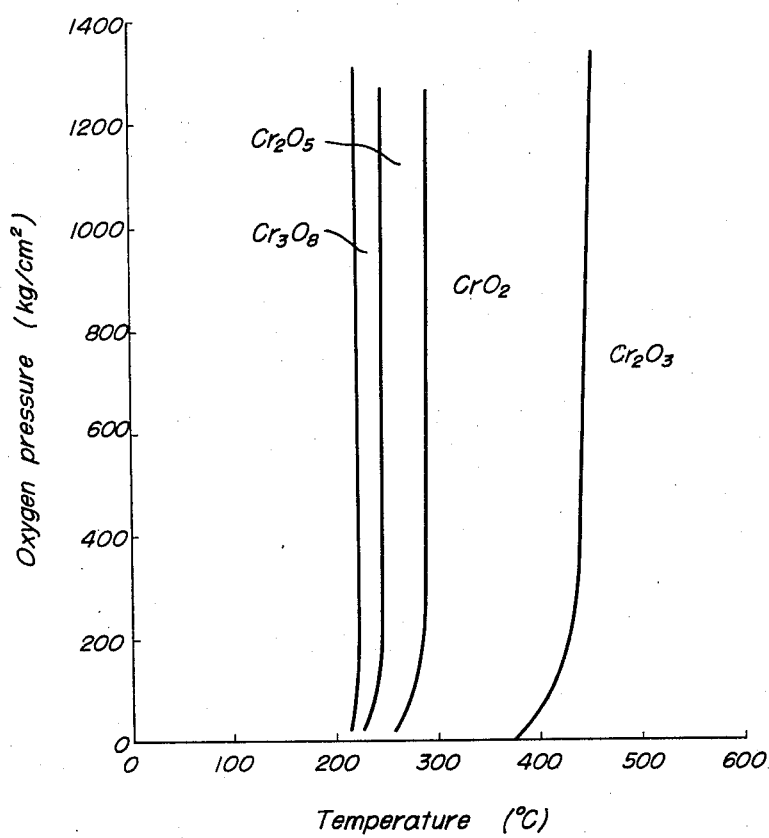
FIGURE 2 is a temperature-oxygen pressure phase diagram showing changes in crystalline forms of a chromium trioxide-tellurium compound mixture where the ratio of chromium ion to tellurium ion is 98 to 2.
Figure 3:
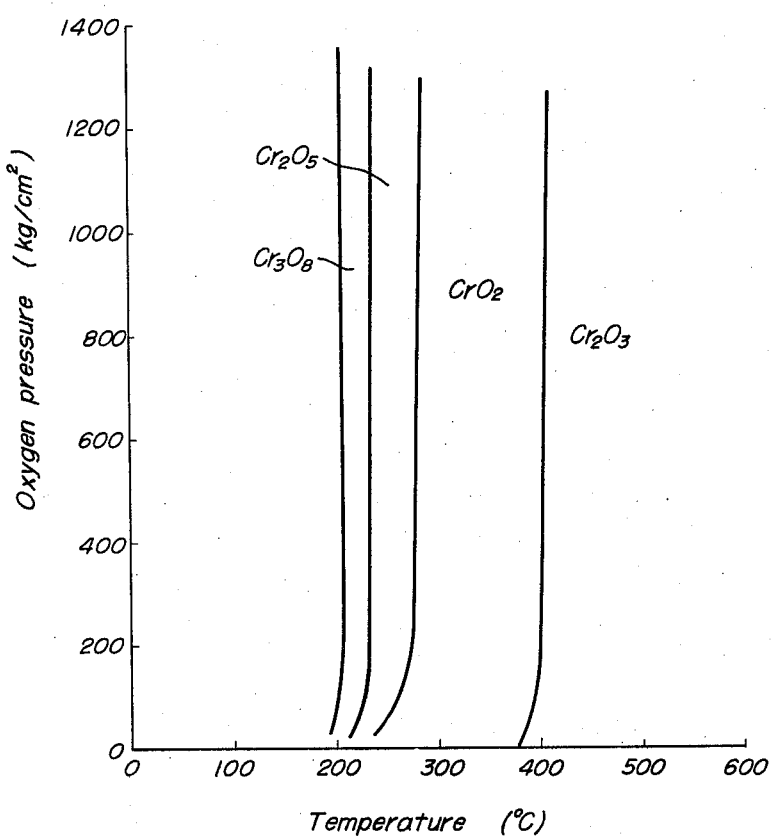
FIGURE 3 is a similar phase diagram to FIGURE 2 where the ratio is 90 to 10.

As is seen in FIGURES 2 and 3 in the accompanying drawings, a mixture of chromium trioxide and tellurium (98%–90% chromium ion and 2%–10% of tellurium ion) produces a ferromagnetic $CrO_2$ having X-ray diffraction lines as shown in Table 1 by heating it wtihin the ranges figured as $CrO_2$. These X-ray lines show that the ferromagnetic $CrO_2$ has a rutile type structure. While a similar mixture where tellurium ion is more than 10% produces a contaminated product, even if heating is effected at a proper range to produce $CrO_2$.

TABLE 1

| d | Intensity | d | Intensity |
|---|---|---|---|
| 3.13 | S | 1.459 | VW |
| 2.435 | M | 1.382 | W |
| 2.213 | VW | 1.318 | W |
| 2.135 | W | 1.066 | VW |
| 1.638 | MS | 0.812 | VW |
| 1.566 | W | | |

Note d: lattice distance
S: strong
M: medium
VW: very weak
W: weak
MS: medium strong (rather strong)

It will also be seen from the accompanying drawings that temperature range producing the $CrO_2$ type crystal moves towards the lower side accordingly as the amount of tellurium increases.

The chromium oxides of a rutile type thus obtained have various properties depending on the manufacturing conditions, i.e. presence of water, heating or cooling rates, temperature and oxygen pressure. In general, however, the properties of the present product are:

Saturation magnetization: less than 102 e.m.u./g. (at room temperature)
Coercive force (iHc): 130–390 oe.
Grain form: from rectangular to needle form
Grain size: less than $2\mu$ in length and less than $1\mu$ in width When the tellurium ion amounts to above 10% in the starting mixture, magnetic features of the product will be somewhat lowered.

*Example 1*

2.5 g. of metallic tellurium were dissolved in 20 cc. of aqua regia, while 100 g. of chromium trioxide were dissolved in 150 cc. of water. The solutions were intimately mixed together, transferred to an evaporating dish and heated on a water bath to dryness with agitation. 8 g. of the obtained chromium trioxide-tellurium mixture was packed in an autoclave (inner volume=4 cc.) and heated in an electric furnace. The autoclave was heated rapidly till 200° C., and slowly above 200° C. at such a rate of 10° C. per hour and the autoclave was maintained at 410° C. for 2 hours. After heating the autoclave was taken out of the furnace and allowed to cool in air. The properties of the product were:

X-ray diffraction: a rutile type crystal
Curie temperature: 115.7° C.
Saturation magnetization: 95 e.m.u./g. (at room temperature)
Coercive force (iHc): 275 oe.
Grain size: 0.8–$1\mu$ length, 0.3–$0.6\mu$ in width After the reaction product was heated at 120° C. in air, it was dispersed in water and subjected to magnetic separation. Saturated magnetization of ferromagnetic portion at room temperature was 101.5 e.m.u./g.

*Example 2*

1 g. of metallic tellurium and 100 g. of chromium trioxide were mixed together as in Example 1 and 4 g. of the product were packed in an autoclave (inner volume=4 cc.). Rapid heating was applied till 200° C. and the autoclave was maintained at 200° C. for 1 hour. Then, the temperature was increased at a rate of 7° C. per hour till 270° C. Temperature was increased from 270° to 380° C. by rapid heating and the autoclave was kept at 380° C. for 10 min. The autoclave was quenched in water. The characteristic properties of the product were:

X-ray diffraction: rutile-type crystal
Saturation magnetization: 100.6 e.m.u./g. (at room temperature)
Curie temperature: 116° C.
Coercive force (iHc): 320 oe.
Grain size and form: needle, 0.5–$0.8\mu$ in length, less than $0.1\mu$ in width

*Example 3*

Example 1 was repeated using 6 g. of metallic tellurium and 100 g. of chromium trioxide and 8 g. of the dry mixture was packed in autoclave (inner volume=4 cc.), excepting that the final heating temperature was 350° C. The product powder was subjected to magnetic separation to remove nonmagnetic substances. The characteristic properties were:

X-ray diffraction: rutile-type crystal
Curie temperature: 115° C.
Saturation magnetization: 97 e.m.u./g. (at room temperature)
Coercive force (iHc): 390 oe.
Grain size: about $0.3\mu$ in length, less than $0.1\mu$ in width

*Example 4*

Using the same mixture as in Example 1, except that drying on a water bath was interrupted so that the mixture was slightly moistened. Heat treatment was the same as Example 1 and a non-magnetic portion in the reaction product was separated by magnetic separation. The characteristic properties were as follows:

X-ray diffraction: rutile-type crystal
Saturation magnetization: 100 e.m.u./g.(at room temperature)
Curie temperature: 138° C.
Coercive force (iHc): 280 oe.
Grain size and form: needle; 0.7–1 in length, 0.3–0.6 in width

*Example 5*

4.5 g. of telluric acid were dissolved in 30 cc. of water while 100 g. of chromium trioxide were dissolved in 150 cc. of water. The solutions were mixed and dried according to Example 1 and heated according to Example 2. The product has the following properties:

X-ray diffraction: rutile type crystal
Curie temperature: 115.8° C.
Saturation magnetization: 98 e.m.u./g. (at room temperature)
Coercive force (iHc): 370 oe.
Grain size: 0.3–$0.5\mu$ in length, less than $0.1\mu$ in width

What we claim is:
1. A process for producing a rutile type ferromagnetic chromium dioxide which comprises heating a mixture of chromium trioxide and a tellurium compound at a temperature between 380° C. and 480° C. in the presence of oxygen.

2. A process for producing a rutile type ferromagnetic chromium dioxide which comprises heating a mixture of chromium trioxide and a tellurium compound at a temperature between 380° C. and 420° C. in the presence of oxygen.

3. A process for producing a rutile type ferromagnetic chromium dioxide which comprises heating in an autoclave, a mixture of chromium trioxide and a tellurium compound at a temperature between 380° C. and 480° C. under the oxygen pressure which is generated from the chromium trioxide in the autoclave.

4. A process for producing ferromagnetic chromium dioxide comprising heating a mixture of chromium trioxide and a tellurium compound at a temperature between 380° C. and 480° C. in the presence of oxygen, to form a mixture of nonferromagnetic material and ferromagnetic chromium dioxide, dispersing said mixture in water at about 100° C. to form a solution and passing a magnet through said solution to remove the ferromagnetic chromium dioxide.

References Cited by the Examiner
UNITED STATES PATENTS

| | | | |
|---|---|---|---|
| 2,956,955 | 10/1960 | Arthur | 252—62.5 |
| 3,080,319 | 3/1963 | Arrington | 252—62.5 |

OTHER REFERENCES

Mellor—"A Comprehensive Treatise on Inorganic and Theoretical Chemistry," vol. XI, 1931, Longmans, Green and Co., London and New York, page 208.

TOBIAS E. LEVOW, *Primary Examiner.*

MAURICE A. BRINDISI, *Examiner.*

R. D. EDMONDS, *Assistant Examiner.*